(12) United States Patent
Palmer et al.

(10) Patent No.: US 10,922,955 B2
(45) Date of Patent: Feb. 16, 2021

(54) BATTERY INTERCONNECTED SMOKE DETECTOR SYSTEM

(71) Applicant: Vireo Tech, LLC, Gilbert, AZ (US)

(72) Inventors: Preston Palmer, Gilbert, AZ (US); Wesley Palmer, Mesa, AZ (US); Larkin Palmer, Payson, AZ (US)

(73) Assignee: Vireo Tech, LLC, Gilbert, AZ (US)

( * ) Notice: Subject to any disclaimer, the term of this patent is extended or adjusted under 35 U.S.C. 154(b) by 225 days.

(21) Appl. No.: 15/969,701

(22) Filed: May 2, 2018

(65) Prior Publication Data

US 2018/0247521 A1 Aug. 30, 2018

Related U.S. Application Data

(63) Continuation-in-part of application No. 14/557,362, filed on Dec. 1, 2014, now Pat. No. 9,966,791, which
(Continued)

(51) Int. Cl.
| | |
|---|---|
| *G08B 29/00* | (2006.01) |
| *G08B 29/18* | (2006.01) |
| *H02J 7/02* | (2016.01) |
| *H02J 7/35* | (2006.01) |
| *H02J 9/06* | (2006.01) |
| *G08B 17/10* | (2006.01) |

(52) U.S. Cl.
CPC ............ *G08B 29/181* (2013.01); *H02J 7/02* (2013.01); *H02J 7/35* (2013.01); *H02J 9/061* (2013.01); *H02J 9/062* (2013.01); *G08B 17/10* (2013.01)

(58) Field of Classification Search
CPC ....... G08B 17/10; G08B 29/181; H02J 9/061; H02J 7/35; H02J 7/02; H02J 9/062
See application file for complete search history.

(56) References Cited

U.S. PATENT DOCUMENTS 3,644,912 A * 2/1972 Allen, Jr. ............... G08B 13/22
340/538
4,199,754 A 4/1980 Johnson et al.
(Continued)

FOREIGN PATENT DOCUMENTS

| WO | 2016089630 A2 | 6/2016 |
| WO | 2017165844 A1 | 9/2017 |

OTHER PUBLICATIONS

International Searching Authority, Written Opinion of the International Searching Authority for PCT/US2015/061957, dated Feb. 23, 2016, pp. 1-15, Virginia, USA.
(Continued)

*Primary Examiner* — Carlos Amaya
*Assistant Examiner* — Esayas G Yeshaw
(74) *Attorney, Agent, or Firm* — Alliance IP, LLC (57) ABSTRACT

Disclosed is a rechargeable battery interconnected smoke detector system of one or more smoke detector(s) wired into a dedicated circuit with a single location housing a DC power backup source, such as a rechargeable DC battery. The DC power backup source may be replaceable or rechargeable with DC current from and AC-DC transformer, a photovoltaic cell, or other means. Electronic relays within the system provide a current to the dedicated circuit by selecting between the line-voltage alternating current source and the DC power backup.

21 Claims, 7 Drawing Sheets

Related U.S. Application Data is a continuation-in-part of application No. 13/407,443, filed on Feb. 28, 2012, now abandoned.

(60) Provisional application No. 61/464,115, filed on Feb. 28, 2011.

(56) References Cited

U.S. PATENT DOCUMENTS

| | | | | |
|---|---|---|---|---|
| 5,365,145 A | * | 11/1994 | Fields | H05B 47/29 |
| | | | | 315/86 |
| 5,640,058 A | * | 6/1997 | Calvo | G08B 17/10 |
| | | | | 169/23 |
| 5,686,884 A | | 11/1997 | Larkin et al. | |
| 5,929,781 A | * | 7/1999 | Vosika | G08B 29/126 |
| | | | | 315/134 |
| 5,973,603 A | | 10/1999 | Judy | |
| 7,576,659 B2 | | 8/2009 | Lax | |
| 9,909,736 B2 | | 3/2018 | Kim et al. | |
| 9,965,935 B2 | | 5/2018 | Palmer et al. | |
| 10,431,055 B2 | | 10/2019 | Palmer et al. | |
| 2002/0195998 A1 | * | 12/2002 | Yu | H02J 7/0029 |
| | | | | 320/134 |
| 2005/0106536 A1 | | 5/2005 | Liebermann | |
| 2005/0159685 A1 | | 7/2005 | Klein et al. | |
| 2005/0178539 A1 | | 8/2005 | Rotta et al. | |
| 2005/0195089 A1 | | 9/2005 | Shomali | |
| 2006/0017560 A1 | | 1/2006 | Albert | |
| 2006/0017579 A1 | | 1/2006 | Albert et al. | |
| 2006/0129308 A1 | | 6/2006 | Kates | |
| 2006/0170542 A1 | | 8/2006 | Schoor | |
| 2006/0195050 A1 | | 8/2006 | Alwan et al. | |
| 2006/0226973 A1 | | 10/2006 | Catlin | |
| 2006/0265195 A1 | | 11/2006 | Woodard et al. | |
| 2007/0040449 A1 | * | 2/2007 | Spurlin | H02J 7/342 |
| | | | | 307/64 |
| 2008/0074885 A1 | | 3/2008 | Brands et al. | |
| 2008/0266121 A1 | * | 10/2008 | Ellul | G08B 7/066 |
| | | | | 340/584 |
| 2008/0272906 A1 | | 11/2008 | Breed | |
| 2008/0315774 A1 | | 12/2008 | May et al. | |
| 2010/0097211 A1 | * | 4/2010 | Silver | G08B 17/10 |
| | | | | 340/540 |
| 2010/0139290 A1 | | 6/2010 | Leblond | |
| 2010/0237695 A1 | | 9/2010 | Covaro et al. | |
| 2010/0308982 A1 | | 12/2010 | Cooperstock et al. | |
| 2011/0210694 A1 | * | 9/2011 | Uehashi | H02J 3/32 |
| | | | | 320/101 |
| 2012/0217799 A1 | | 8/2012 | Palmer et al. | |
| 2013/0025851 A1 | | 1/2013 | Laing et al. | |
| 2014/0001977 A1 | * | 1/2014 | Zacharchuk | H04B 7/0608 |
| | | | | 315/291 |
| 2014/0203943 A1 | | 7/2014 | Kates | |
| 2014/0266669 A1 | * | 9/2014 | Fadell | G06N 5/04 |
| | | | | 340/501 |
| 2015/0084780 A1 | | 3/2015 | Palmer et al. | |
| 2015/0116107 A1 | * | 4/2015 | Fadell | G08B 19/005 |
| | | | | 340/501 |
| 2015/0187194 A1 | | 7/2015 | Hypolite et al. | |
| 2015/0216017 A1 | | 7/2015 | Pratt et al. | |
| 2015/0279188 A1 | * | 10/2015 | Zhao | G08B 21/0469 |
| | | | | 340/584 |
| 2016/0210825 A1 | | 7/2016 | Palmer et al. | |
| 2016/0238237 A1 | | 8/2016 | Palmer et al. | |
| 2016/0335867 A1 | | 11/2016 | Palmer et al. | |
| 2018/0247521 A1 | | 8/2018 | Palmer et al. | |

OTHER PUBLICATIONS

PCT International Preliminary Report on Patentability in PCT International Application Serial No. PCT/US2015/061957 dated Jun. 6, 2017 (7 pages).

PCT International Preliminary Report on Patentability in PCT International Application Serial No. PCT/US2017/024139 dated Sep. 25, 2018 (7 pages).

PCT International Search Report and Written Opinion in PCT International Application Serial No. PC/TUS2017/024139 dated Aug. 11, 2017.

PCT International Search Report and Written Opinion in PCT International Application Serial No. PCT/US2015/061957 dated Feb. 23, 2016 (8 pages).

\* cited by examiner

BATTERY INTERCONNECTED SMOKE DETECTOR SYSTEM

CROSS REFERENCE TO RELATED APPLICATION

This application is a continuation-in-part of U.S. patent application to Preston Palmer et al. entitled "CENTRAL BATTERY INTERCONNCECTED SMOKE DETECTOR SYSTEM WITH SINGLE WIRE AC AND DC PASS-THROUGH RELAY," Ser. No. 14/557,362, filed Dec. 1, 2014, which is a continuation-in-part of application Ser. No. 13/407,442, filed on Feb. 28, 2012 claiming priority to provisional application No. 61/464,115 filed on Feb. 28, 2011, the disclosures of which are hereby incorporated entirely herein by reference.

BACKGROUND OF THE INVENTION

Technical Field

This invention relates to residential smoke alarm/detector systems. In particular, this invention relates to a device and method of use for providing direct current ("DC") backup power through a dedicated wiring circuit to an interconnected system of smoke detection devices installed in a residential or commercial building.

State of the Art

A reliably functioning system of smoke detectors in a home or commercial building saves lives. In the U.S., many states require smoke alarms/detectors in both residential and commercial buildings, particularly in new construction. Current smoke alarm systems vary in the manner through which the individual detectors are interconnected and powered. Most commonly, smoke detectors are wired into an isolated AC power circuit ("dedicated circuit") in a residential or commercial building to provide a reliable, continuous source of power. In the event of a power failure, a conventional DC battery within each detector provides backup power to the device. This generally works fine, unless these backup-power batteries fail or are disconnected.

According to the National Fire Protection Association ("NFPA"), almost two-thirds of home fire deaths from 200-2009 resulted from fires in homes without smoke detector alarms or in homes where smoke detector alarms were non-functioning. The NFPA reports that eighty percent of smoke alarm failures during this period arose from a missing or disconnected battery, dead or discharged battery, or line alternating current ("AC") power failure/shut-off/disconnect. When the voltage of a backup DC battery in an individual smoke detector weakens, a typical detector emits an audible alarm consisting of regular, loud beeps or chirps, alerting the building's occupant to replace the old, discharged battery with a fresh one.

This system of using replaceable batteries as backup power for individual smoke detectors, however, is flawed. A chirping smoke detector is widely perceived as a nuisance, particularly when the chirping begins at night when building occupants are sleeping. Smoke detectors are usually mounted on the ceiling, at best requiring a ladder or large stepstool to access the detector and change the battery. At worst, the detector may be mounted on a high ceiling, as much as thirty feet from the floor. Access to these ceiling-mounted smoke detectors is often troublesome and sometimes dangerous. The NFPA observes that "when smoke alarms should have operated but did not do so, it was usually because batteries are missing, disconnected or dead. People are most likely to remove or disconnect batteries because of nuisance activations. Sometimes, the chirping to warn of a low battery is interpreted as a nuisance alarm."

Accordingly, what is needed is a device that provides a backup power source to an existing interconnected system of smoke detectors in a residence or commercial building, and monitors the functionality of each individual device.

DISCLOSURE OF EMBODIMENTS OF THE INVENTION

This invention relates to smoke alarm/detector systems. In particular, the invention relates to a device and method of use for providing direct current ("DC") backup power through a dedicated circuit to an interconnected system of smoke detection devices installed in a residential or commercial building.

Disclosed is a rechargeable battery interconnected smoke detector system comprising a plurality of smoke detectors electrically coupled to a dedicated circuit; an alternating current source; a rechargeable battery located inside a case housing one of the plurality of smoke detectors; and a first relay directly electrically coupled to the dedicated circuit, the alternating current source, and the rechargeable battery, wherein the first relay selectively conducts an alternating current to the dedicated circuit under a condition wherein the alternating current source is present and selectively conducts a direct current from the rechargeable battery to the dedicated circuit under a condition wherein the alternating current source is not present.

In some embodiments, the dedicated circuit comprises a ground plus three-wire circuit. In some embodiments, the dedicated circuit comprises a ground plus two-wire circuit. In some embodiments, the system comprises a first timed relay electrically coupled between the alternating current source, the first direct current source, and the first relay. In some embodiments, the system comprises a third relay electrically coupled between the dedicated circuit and the smoke detector.

In some embodiments, the system further comprises a low voltage controller electrically coupled between the rechargeable battery and the first relay; and a second direct current source, wherein the low voltage controller conducts a charging current to the rechargeable battery by selecting the second direct current source. In some embodiments, the system comprises an alternating current to direct current transformer electrically coupled to the alternating current source and the low voltage controller, wherein the second direct current source is the transformer.

In some embodiments, the low voltage controller comprises a second relay electrically coupled to the rechargeable battery, a photovoltaic cell, and the first relay, and wherein the second relay conducts the charging current to the rechargeable battery by selecting from a plurality of second direct current sources. In some embodiments, the plurality of second direct current sources comprise the photovoltaic cell and an alternating to direct current transformer electrically coupled to the alternating current source and the low voltage controller.

In some embodiments, the low voltage controller further comprises a second timed relay electrically coupled between the first direct current source and the second relay. In some embodiments, the low voltage controller responds to one activated smoke detector of the plurality of smoke detectors by activating the plurality of smoke detectors.

In some embodiments, the system further comprises a system panel electrically interposed between a service entrance panel and the dedicated circuit.

In some embodiments, the smoke detector system is coupled to a fire alarm.

Disclosed is a smoke detector comprising a case enclosing an alternating current circuit, a direct current circuit, a rechargeable battery coupled to the direct current circuit, an external current source, and a third relay; wherein the third relay determines whether the external current source is an alternating current or a direct current and routes the external current source to the alternating current circuit or the direct current circuit of the smoke detector accordingly.

In some embodiments, the external current source is a direct current source from one of the group of direct current sources comprising a photovoltaic cell and an alternating-to-direct-current transformer.

Disclosed is an interconnected smoke detector system comprising a smoke detector enclosed in a case and electrically coupled to a dedicated circuit; an alternating current source; a first direct current source comprising a rechargeable battery enclosed in the case; a second direct current source from the group of second direct current sources comprising a photovoltaic cell and a direct-to-alternating-current transformer; a first relay electrically coupled to the alternating current source and the first direct current source, wherein the first relay selectively conducts an alternating current to the dedicated circuit under a condition wherein the alternating current source is present and selectively conducts a direct current from the rechargeable battery to the dedicated circuit under a condition wherein the alternating current source is not present; and a low voltage controller electrically coupled between the first direct current source and the first relay, comprising a second relay electrically coupled to the rechargeable battery, the second direct current source, and the first relay, wherein the second relay conducts a charging current to the rechargeable battery from the second direct current source.

In some embodiments, the low voltage controller is enclosed in the case.

In some embodiments, the system further comprises a plurality of smoke detectors electrically coupled to the dedicated circuit, wherein the first relay selectively conducts an alternating current to the dedicated circuit under a condition wherein the alternating current source is present and selectively conducts a direct current from the rechargeable battery to the dedicated circuit under a condition wherein the alternating current source is not present.

Disclosed is a method of forming a rechargeable battery interconnected smoke detector system comprising electrically coupling a smoke detector having a rechargeable battery to an interconnected network of smoke detectors on a dedicated circuit; and electrically coupling a first relay directly to an alternating current source, the rechargeable battery, and the smoke detector, wherein the first relay conducts an alternating current to the smoke detector under a condition wherein the alternating current source is present and selectively delivers a direct current to the smoke detector under a condition wherein the alternating current source is not present.

In some embodiments, the method further comprises electrically coupling a low voltage controller between the rechargeable battery and the first relay; and electrically coupling the rechargeable battery to the low voltage controller, wherein the low voltage controller conducts a charging current to the rechargeable battery by selecting a second direct current source.

In some embodiments, the method further comprises electrically coupling an alternating to direct current transformer between the alternating current source and the low voltage controller; and electrically coupling a photovoltaic cell to the low voltage controller, wherein the low voltage controller selects the charging current from between the transformer and the photovoltaic cell.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

As discussed above, the disclosed invention relates to a smoke detector system with a remotely located DC battery power backup. In the event of an AC power failure, the system conducts a reliable, continuous DC backup to one or a plurality of smoke detectors electrically coupled to a dedicated circuit, eliminating the need for a DC battery within each individual smoke detector.

Existing smoke detector systems use community-distributed AC power. There are, however, many common reasons this line AC power fails which necessitate the need for a backup power source for the smoke detector. Examples of AC power failure include unintentional physical damage to power lines or other components of the community power distribution system, such as from a severe weather event or generation failure. Service may also be intentionally disconnected for non-payment, or following a bank foreclosure, or abandonment of the property. Accordingly, commercially available smoke detectors employ a nine-volt or other small DC battery housed within each individual smoke detector/alarm unit as a back-up source of power in the event AC power fails.

This ubiquitous system utilizing a different battery in each individual smoke detector is inadequate. When a detector's battery is charged and functioning, the backup system works well. Problems arise, however, when a battery ages, loses its charge, and eventually fails. When the battery voltage drops below a given level, a conventional smoke detector will emit a periodic audible alarm, such as a loud "chirp." If the building housing the detector is occupied, this alarm is usually effective at getting the occupants' attention. A responsible occupant or building owner will respond by simply replacing the old, discharged battery with a new, fresh battery.

All too often, however, this does not happen for two general reasons. The first reason is because changing the battery in even one standard smoke detector is inconvenient. Detectors are usually mounted on a ceiling, and require at least a step-stool, if not a tall ladder, for access. Even a small residence will have three or four detectors; a large house may have up to a dozen or more. Therefore, a typical building will house multiple detectors in difficult-to-access locations, each with a different battery which will fail and require replacement in its own time, different from all the other batteries. Some occupants change each battery as it fails. Others change all the detector batteries when one detector battery fails, which results in discarding some batteries prematurely creating an unnecessary expense. To avoid future inconvenience, however, many occupants respond to a detector's battery-failure alarm by disabling or removing all the smoke detectors in the building.

The second reason is because the building is unoccupied for an extended period. Many homes and buildings stand vacant for months or years awaiting sale, or while awaiting renovation or restoration. Buildings unoccupied for a lengthy period often have no AC electrical service. A great many of these buildings are not regularly visited or attended. If functioning smoke detectors are present in these buildings, the batteries all fail after an extended period and the building is left without a functioning fire alarm system.

Embodiments of the disclosed invention solve these and other problems by eliminating the need to monitor and regularly change batteries housed in smoke detectors located in hard-to-reach locations. The disclosed invention provides a continuous reliable source of backup DC power for smoke detectors wired into a dedicated circuit.

Disclosed is a rechargeable battery interconnected smoke detector system with single wire AC and DC pass-through relay. What immediately follows is a general overview of the system. Afterward, additional details are provided in a detailed description of each of the various drawing figures.

In some embodiments, the system generally comprises an AC power source 104, a first direct current source 203, a first relay 210, a dedicated circuit 102, and a smoke detector 400. First relay 210 is electrically coupled to an AC power source 104, a first direct current source 203, and a dedicated circuit 102 coupled to one or a plurality of smoke detectors 400. AC power source 104, in some embodiments, is from a conventional power generation and distribution system. For purposes of this disclosure, the term "line voltage" is used synonymously with AC power source 104. First direct current source 203, in some embodiments, is from a rechargeable battery 310 (shown in FIG. 2, FIG. 3, FIG. 4, and FIG. 5.) In various embodiments, first relay 210 selectively delivers AC power source 104 to smoke detector(s) 400 through dedicated circuit 102 so long as AC power source 104 is present. When AC power source 104 is absent, such as during a power failure or disconnected service, first relay 210 selectively delivers first direct current source 203 to smoke detectors 400 through dedicated circuit 102. First relay 210, by default, energizes dedicated circuit 102 with AC power, switching to DC battery power when AC power fails or is otherwise absent. When AC power source 104 is absent, first relay 210 delivers DC power from first direct current source 203 to smoke detector(s) 400 through the same physical wiring—dedicated circuit 102—as is energized with AC from alternating current power source 104 when line voltage is present. In this manner, various embodiments of the invention, allow for a single-battery source of back-up DC power to one or a plurality of smoke detector(s) 400, eliminating the need to house a battery within each individual smoke detector 400.

In some embodiments, dedicated circuit 102 comprises a three-wire plus ground circuit. For example, dedicated circuit 102 includes an energized "hot" wire, a neutral wire, and a third wire electrically coupled to all smoke detectors 400 on system 100 but not directly electrically coupled to AC power source 104, and a ground wire.

A central battery AC/DC controller panel 130, in some embodiments, is located in a convenient location in or immediately outside the building. It is convenient to install controller panel 130 adjacent or near the building's traditional service-entrance electrical panel. Controller panel 130, in some embodiments, houses first direct current source 203 and first relay 102. Controller panel 130, in some embodiments, receives AC power source 104 via the building's service entrance panel, typically a circuit breaker box. Controller panel 130, in some embodiments, outputs AC power or direct current, as determined by first relay 210, back to the service entrance panel to energize dedicated circuit 102. In some embodiments, battery 310 is housed in the control panel. In some embodiments, battery 310 is house within a case 420 of a single smoke detector 400. In some embodiments, controller panel 130 is mounted at standing-eye-level, so that a stool or ladder is not required to access first direct current source 203. Therefore, in some embodiments of the invention where first direct current source 203 comprises a rechargeable DC battery, the need for multiple periodic battery changes is eliminated. Some embodiments additionally comprise one or more additional direct current sources, such as a photovoltaic cell and/or AC power source 104 current modified by an AC/DC transformer, for example.

Figure 1:
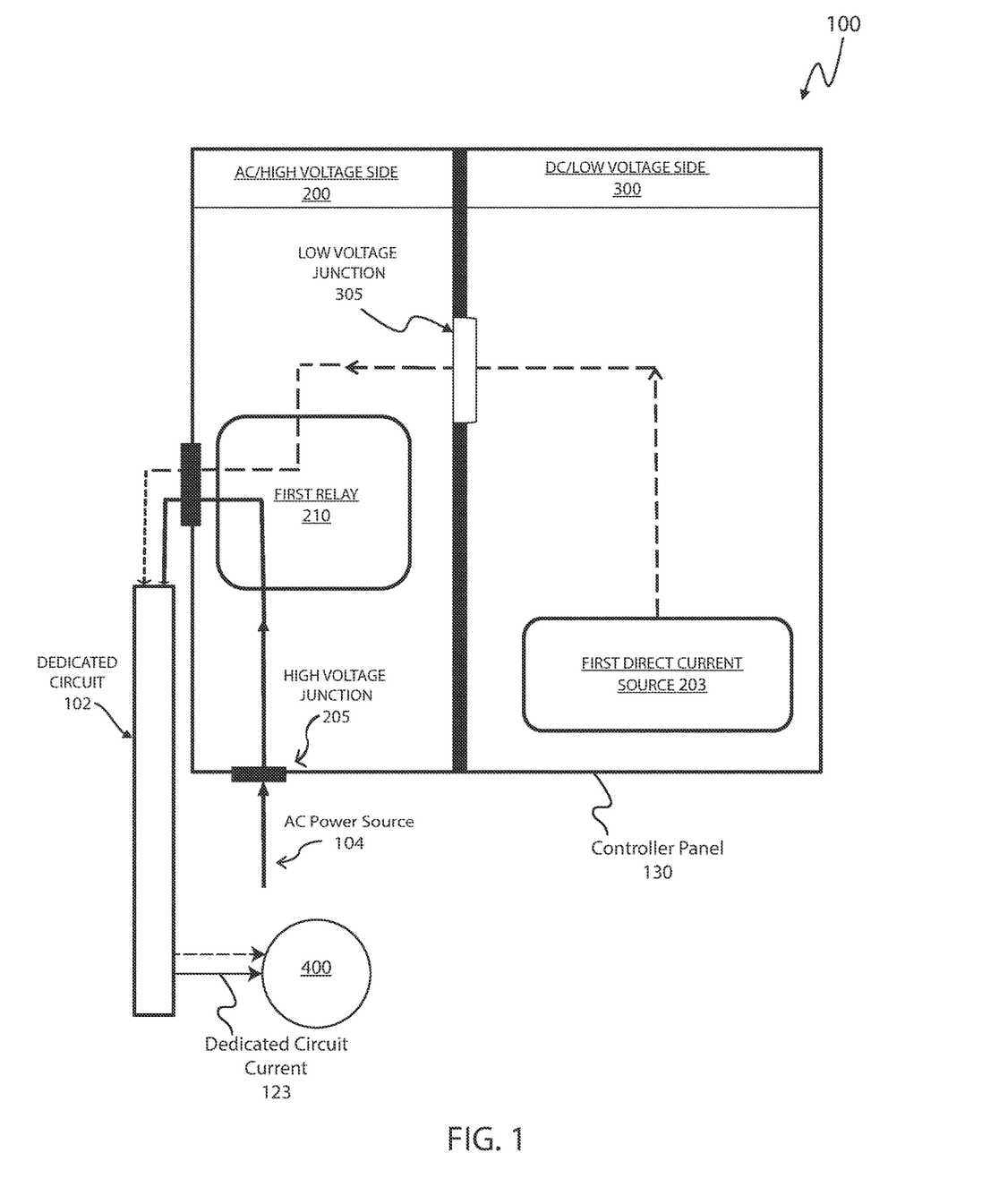
FIG. 1 is a schematic view of a battery interconnected smoke detector system.

FIG. 1 shows an example embodiment of an interconnected smoke detector system 1. System 100 comprises controller panel 130 with an AC/high voltage side 200 and a D/C low voltage side 300, dedicated circuit 102, and smoke detector 400. In FIG. 1, and other drawing figures, solid lines connecting components represent electrical connections conducting AC power and dashed lines connecting components represent electrical connections conducting DC power. Arrows on the ends and/or mid-segments of solid and dashed electrical connection lines represent the direction of current flow. AC/high voltage side 200 comprises first relay 210. In the embodiment shown in FIG. 1, alternating current from AC power source 104 enters an AC/high voltage side 200 of system 100 and is electrically coupled to first relay 210. As mentioned above, first relay 210 is also electrically coupled to first direct current source 203 and dedicated circuit 102. First direct current source 203, in some embodiments, is housed inside DC/low voltage side 300 of smoke detector system 100, and is discussed in detail below.

It is useful, in some embodiments, to separate AC/high voltage from DC/low voltage within controller panel 130 for safety reasons. In the U.S., line AC voltage is 220 volts, stepped-down to 110 volts at the service entrance panel. Contact with high voltage AC power from a typical 110-volt AC power source 104 may, under certain conditions, result in electrocution. Further, the need to access any of system 100's components located in AC/high voltage side 200 should be very infrequent. Conversely, contact with relatively low voltage, such as DC power from a typical 12 volt first direct current source 203, in some embodiments, should almost never result in serious injury. In some embodiments, it is anticipated that first direct current source 203 may periodically need replacement, such as when a non-rechargeable DC battery or a rechargeable DC battery comprises first direct current source 203. Therefore, controller panel 130, in some embodiments, is constructed to physically isolate the relatively safe currents present in DC/low voltage side 300 from the more hazardous currents present in AC/high voltage side 200.

In system 100 shown in FIG. 1, wiring carrying DC current from first direct current source 203 pass from DC/low voltage side 300 to AC/high voltage side 200 through a low voltage junction 305. Low voltage junction 305, in some embodiments, is any one of a variety of pass-through conduits commercially available and known to those in the art electrically insulated from contact with the physical partition between AC/high voltage side 200 and DC/low voltage side 300 of controller panel 130. Similarly, AC power from AC power source 104 enters AC/high voltage side 200 through a high voltage junction 205. High voltage junction 205, in some embodiments, is any one of a variety of pass-through conduits commercially available and know to those in the art electrically insulated form contact with the physical outer wall of controller panel 130

First relay 210 of system 100, in the embodiment shown in FIG. 1 and some other embodiments, selectively delivers alternating current from AC power source 104 to dedicated circuit 102 so long as AC power is available. In some embodiments, first relay 210 is rated for a 110 V AC input and a 12 V DC input. In some embodiment, first relay 210 is a mechanical relay. In some embodiments, first relay 210 is a solid-state relay. In some embodiments, first relay 210 is selected from a variety of commercially available devices known in the art. Factors affecting the choice of first relay 210 include the AC voltage and amperage of the line current entering first relay 210 from AC power source 104. In a default condition where line voltage is present from AC power source 104, first relay 210 conducts AC power to dedicated circuit 102.

Dedicated circuit 102 is a circuit electrically coupled to a smoke detector 400 or an interconnected plurality of smoke detectors 400. Interconnecting smoke detectors on a dedicated circuit has widely been adopted in residential building codes throughout the U.S. since written into the National Fire Alarm Code in 1989. Therefore, dedicated circuit 102 is generally present in all newer residential buildings and widely known to those with skill in the art. Interconnecting smoke detectors on dedicated circuit 102 allows for the activation of one smoke detector 400 to simultaneously activate all other smoke detectors 400 on dedicated circuit 102.

When AC power source 104 is absent, first relay 210 delivers DC power from first direct current source 203 to smoke detector(s) 400 through the same physical wiring— dedicated circuit 102—as is energized with AC from alternating current power source 104 when line voltage is present. Although dedicated circuit 102 is energized with AC power when AC power is available, dedicated circuit 102 is able to conduct sufficient direct current to energize a plurality of smoke detectors 400 along the limited lengths of wire present in a residential building without a substantial voltage drop across the internal electrical resistance in dedicated circuit 102's wires. Further, because dedicated circuit 102 is only coupled to smoke detectors 400 and no other electrical loads, electrical resistance is minimized and available voltage is conserved. Therefore, when line AC is not available, first relay 210 opens a circuit to first direct current source 203, wherein dedicated circuit 102 is powered by first direct current source 203. First direct current source 203 provides adequate DC power to energize a plurality of smoke detectors 400 electrically coupled to dedicated circuit 102 without a drop in voltage below the operational threshold voltage of smoke detectors 400.

FIG. 1 also shows dedicated circuit 102 carrying a dedicated circuit current 123 to smoke detector 400. As discussed, when an AC power source 104 is present, dedicated circuit current 123 is AC. When AC power source 104 is absent, dedicated circuit current 123 is DC. FIG. 1 shows dedicated circuit current 123 as two electrical connections, one DC and one AC. This is merely a schematic representation; the same physical wiring conducts either AC power or DC power, depending upon whether AC power source 104 is present. First relay 210 selectively chooses whether to energize dedicated circuit 102 with DC power depending upon the availability of AC power from AC power source 104 as discussed.

System 100 comprises additional useful features, in some embodiments. In some embodiments, system 100 further comprises emergency lighting means activated by DC power from first direct current source 203 conducted through first relay 210 following an interruption of AC power source 104. In some embodiments, a smoke detector 400 further comprises a lighting means. In some embodiments, a lighting means is electrically coupled to dedicated circuit 102 and is mounted in a separate location from smoke detector 400. Lighting means may be a light emitting diode, by way of example, or other suitable means.

Figure 2:
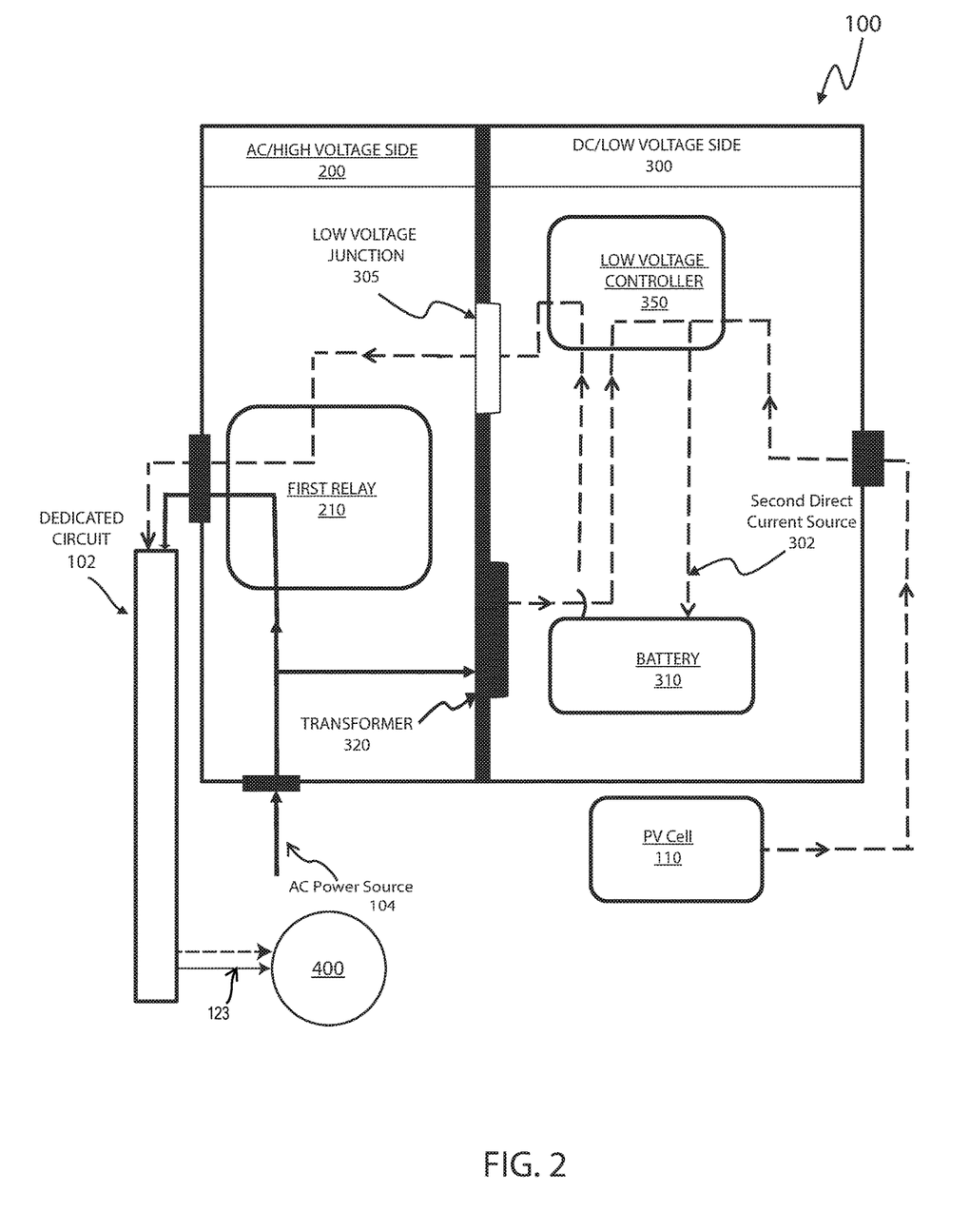
FIG. 2 is a schematic view of a battery interconnected smoke detector system.

FIG. 2 shows an example embodiment of an interconnected smoke detector system 100. In the embodiment shown in FIG. 2, and in some other embodiments, a battery 310 is first direct current source 203. Battery 310, in some embodiments, is a non-rechargeable DC battery, such as a 12-volt dry cell "lantern" battery. In some embodiments, battery 310 is two 6-volt dry cell batteries electrically connected in series to deliver 12 volts. In still other embodiments, battery 310 is some other non-rechargeable battery or a combination of batteries such that the total available voltage and current provided by battery/batteries 310 result in a first direct current source of sufficient voltage and available current to power the building's system of smoke detectors 400 interconnected on dedicated circuit 102. Some advantages of using a non-rechargeable battery 310 as first direct current source 203 are low cost and a simpler design. One disadvantage is the limited useful life of a non-rechargeable battery before it needs to be replaced. Another disadvantage is failure of available backup DC power (i.e., first direct current source 203) to power smoke detector system 100 in a building which has been abandoned or otherwise unattended for a long period of time.

In some embodiments, battery 310 is a rechargeable battery. The use of a rechargeable battery 310 versus a non-rechargeable battery 310 is advantageous in some embodiments of smoke detector system 100 providing an automatic recharging means, such as system 100 shown in FIG. 2 and discussed further below. A rechargeable battery has a much, much longer useful life than a non-rechargeable battery. In a system 100 wherein a rechargeable battery 310 is used, additional components comprising an automatic recharging means provide for a first direct current source 203, such as a rechargeable battery 310 for example, to provide potentially years of continuous DC power to smoke detectors 400 in a completely unattended building where AC power source 104 is continuously unavailable, or unavailable for extended periods. One example of a rechargeable battery is a UB 1250 12-volt sealed lead-cell battery. This is by way of example only. Battery 310 may be a rechargeable lead cell, nickel-cadmium, lithium hydride, or any other suitable battery, whether rechargeable or not. Many other suitable examples are commercially available and known to those skilled in the art.

FIG. 2 shows a means for recharging battery 110 of system 100 with a second DC current source 302. In the embodiment of system 100 shown in FIG. 2 and in some other embodiments, DC/low voltage side further comprises a low voltage controller 350, a transformer 320, and a PV cell 110. In some embodiments, low voltage controller 350 selectively chooses second direct current source 203 from between a plurality of sources, such as PV cell 110 or AC power source 104 modified by transformer 320, for example. In the embodiment shown in FIG. 2, low voltage controller 350 is electrically coupled to PV cell 110, transformer 320, battery 310, and first relay 210. In some embodiments, low voltage controller 350 selects and routes DC power from second direct current source 203 to recharge battery 310. In some embodiments, low voltage controller also routes DC from first direct current source 203, such as battery 310 in the embodiment shown, to first relay 210.

In some embodiments, low voltage controller 350 selects a DC charging current output from a plurality of available second direct current source 302 inputs. In the example embodiment shown by FIG. 2, low voltage controller 350 conducts DC from transformer 320 to charge battery 310 under conditions where AC power source 104 is present. Under conditions where AC power source 104 is not present, such as a power outage or disconnection of service, low voltage controller 350 conducts DC from PV cell 110, provided DC is available from PV cell 110. In some embodiments, low voltage controller comprises a battery charging means to regulate DC delivered to battery 310 by monitoring the charge state of battery 310. Such a charging means functions to maximize the charge status and extend the useful life of battery 310. Consequently, battery 310 remains fully charged by low voltage controller 350 under conditions where either AC power source 104, sunlight, or both are available in some embodiments, including the embodiment shown in FIG. 2.

Transformer 320, in some embodiments, is an AC/DC step-down transformer operating between 110-volt AC and 12-volt DC voltages. Transformer 320 converts 110-volt AC line input power to 12-volt DC power for recharging battery 310, in some embodiments. Transformer 320 may be selected from a variety of commercially available AC/DC step-down voltage transformers to operate between different ranges of AC and DC voltages and amperages depending upon the characteristics of AC power source 104 and the parameters under which low voltage controller 350 recharges battery 310. These parameters, in turn, depend upon the charging requirements of battery 310.

PV cell 110 is a photovoltaic cell electrically coupled to low voltage controller 350. PV cell 110 provides threshold DC amperage at 12 volts to generate a charging current for battery 110 under conditions where PV cell 110 is exposed to adequate incident sunlight. Many suitable examples of photovoltaic cells for use as PV cell 110 are commercially available and may be used in various embodiments of the invention. In some embodiments, PV cell 100 is a relatively small photovoltaic cell, 12 inches to 18 inches by 24 inches, for example, which is secured in a sunlit indoor location, such as an un-shaded southern-facing window, to deter theft or vandalism, in some embodiments. In some embodiments, PV cell 100 is secured in an outdoor location. In some embodiments, PV cell 100 is mounted on the outside of controller panel 100. In some embodiments, PV cell 100 is secured to the building's outer wall, a rooftop, a stand-alone mounting pole, a fence, an out-building or any other suitable outdoor location exposed to sunlight.

In some embodiments (not shown in the drawing figures), first direct current source 203 comprises PV cell 110. In these and other embodiments, low voltage controller 350 conducts DC power from PV cell 110 directly through low voltage junction 305 to first relay 210 when DC power at a threshold voltage is generated by PV cell 110.

Figure 3:
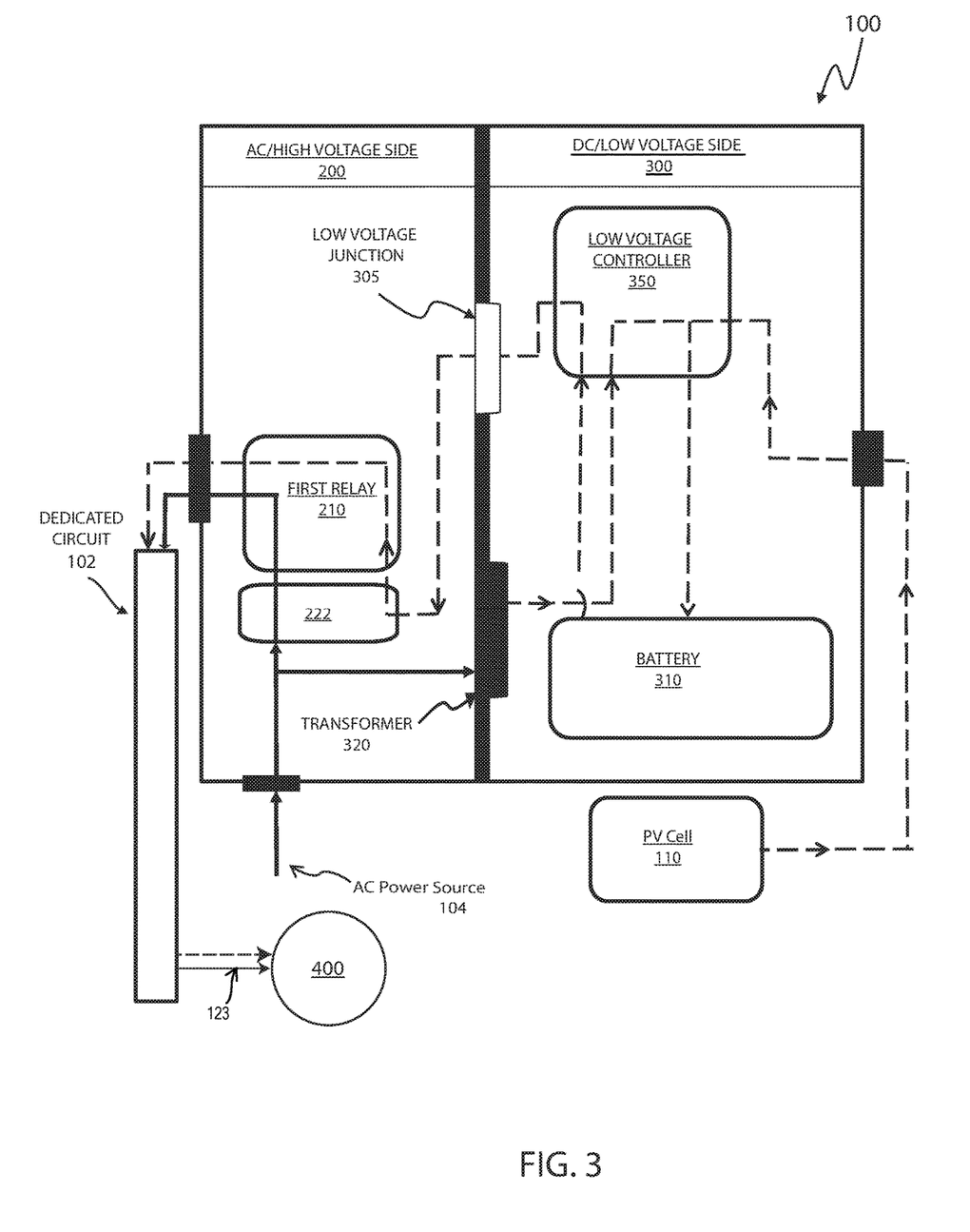
FIG. 3 is a schematic view of a battery interconnected smoke detector system.

FIG. 3 shows an example embodiment of an interconnected smoke detector system 100. System 100 comprises all the elements of system 100 shown by FIG. 2 with the addition of first timed relay 222. Interposing a timed relay between current sources inputting to dedicated circuit 102 through first relay 210 allows high voltage charge present within capacitors and other electronic components of smoke detectors 400, dedicated circuit 102, and first relay 210 at the instant preceding cessation of AC power from AC power source 104 to dissipate prior to re-energizing these elements with low voltage DC power from first direct current source 203. Additionally, use of a timed relay in some embodiments is a mechanism to increase safety by minimizing or eliminating any risk of electrical arcs or interference between AC and DC in the same circuit. The use of first timed relay 222, second timed relay 312, and third timed relay 422, in some embodiments, is by example only. Other electronic components, such as resistors of diodes, for example, may be used in system 100 to accomplish the same or similar function.

First timed relay 222 is electrically coupled to AC power source 104, low voltage controller 350, and first relay 210. In some embodiments, first timed relay 222 is a mechanical relay. In some embodiments, first timed relay 222 is a solid-state relay. First time relay 222 is electrically interposed between AC and DC input currents and first relay 210 to provide a timed delay between termination of AC power and transmission of DC power from low voltage controller 350 to first relay 210. In some embodiments, this is a one second delay. In some embodiments, this delay is between 500 milliseconds and one second. In some embodiments, this delay is shorter than 500 milliseconds. In some embodiments, this delay is longer than one second. First timed relay 222 may be selected from mechanical or solid-state relays that are commercially available and know to those with skill in the art.

Figure 4:
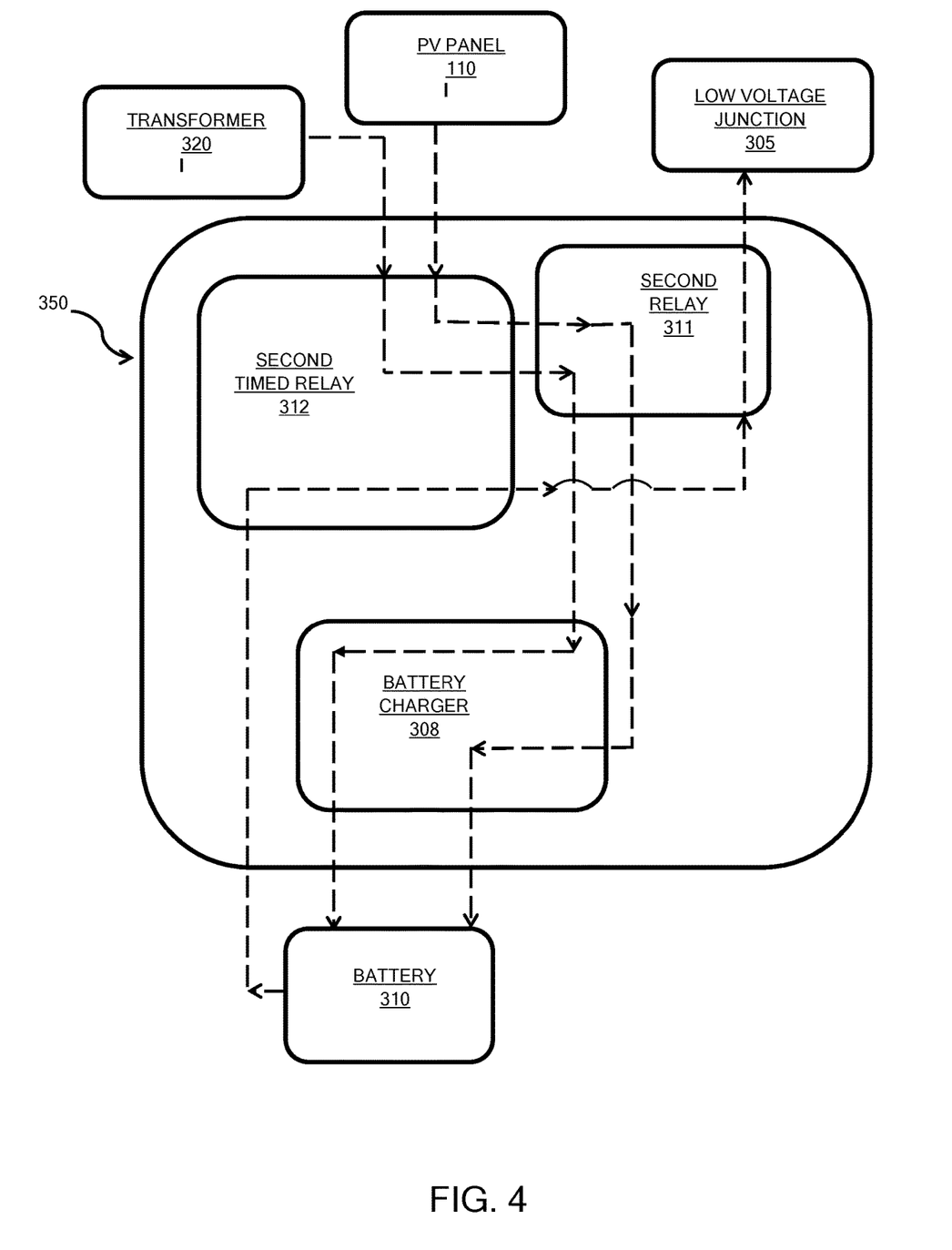
FIG. 4 is a schematic view of a low voltage controller of a battery interconnected smoke detector system.

FIG. 4 shows a detailed schematic representation of some embodiments of low voltage controller 350. Low voltage controller 350 has two functions. First, low voltage controller 350 functions to direct a charging DC to battery 310 from a plurality of second direct current sources 302. In some embodiments, second direct current source 302 is AC power source 104 modified by transformer 320. In some embodiments, second direct current source 302 is PV panel 110. In still other embodiments, second direct current source 302 is an additional direct current source not described herein. Any combination of one, two, three, or more second direct current sources 302 are used in various embodiments of the invention. Second, low voltage controller 350 functions to route DC power from first direct current source 203 (represented by battery 310 in the embodiments shown) to first relay 210 or first timed relay 222, depending on the embodiment.

In the embodiment shown in FIG. 4, low voltage controller 350 comprises second relay 311, a second timed relay 312, and a battery charger 308. Low voltage controller 350 is electrically coupled to battery 310, transformer 320, and/or PV panel 110. This arrangement is not meant to be limiting. Any number and combination of electrical/electronic devices can be assembled to perform the two functions disclosed herein above. For example, low voltage controller 350 may simply comprise a unitary solid-state device such as a commercially available DC-DC power management integrated circuit known to those skilled in the art.

In the embodiment shown in FIG. 4, and in some other embodiments, battery 310 is electrically coupled to second timed relay 312 of low voltage controller 350. Second timed relay 312 functions similarly to first timed relay 222 discussed herein above. In some embodiments, second timed relay 312 is electrically interposed between battery 310 and second relay 311 and creates a timed delay between termination of DC power from transformer 320 and transmission of DC power from battery 310 to second relay 311. In some embodiments, this is a one second delay. In some embodiments, this delay is between 500 milliseconds and one second. In some embodiments, this delay is shorter than 500 milliseconds. In some embodiments, this delay is longer than one second. Second timed relay 312 may be selected from mechanical or solid-state relays that are commercially available and know to those with skill in the art. In some embodiments (not shown), second timed relay 312 is not present and battery 310 is electrically coupled to second relay 311 in these embodiments lacking second timed relay 312.

When no AC power source 104 is available, DC power from battery 310 is routed through low voltage junction 305 to AC/high voltage side 200 (See FIG. 1.)

Figure 5:
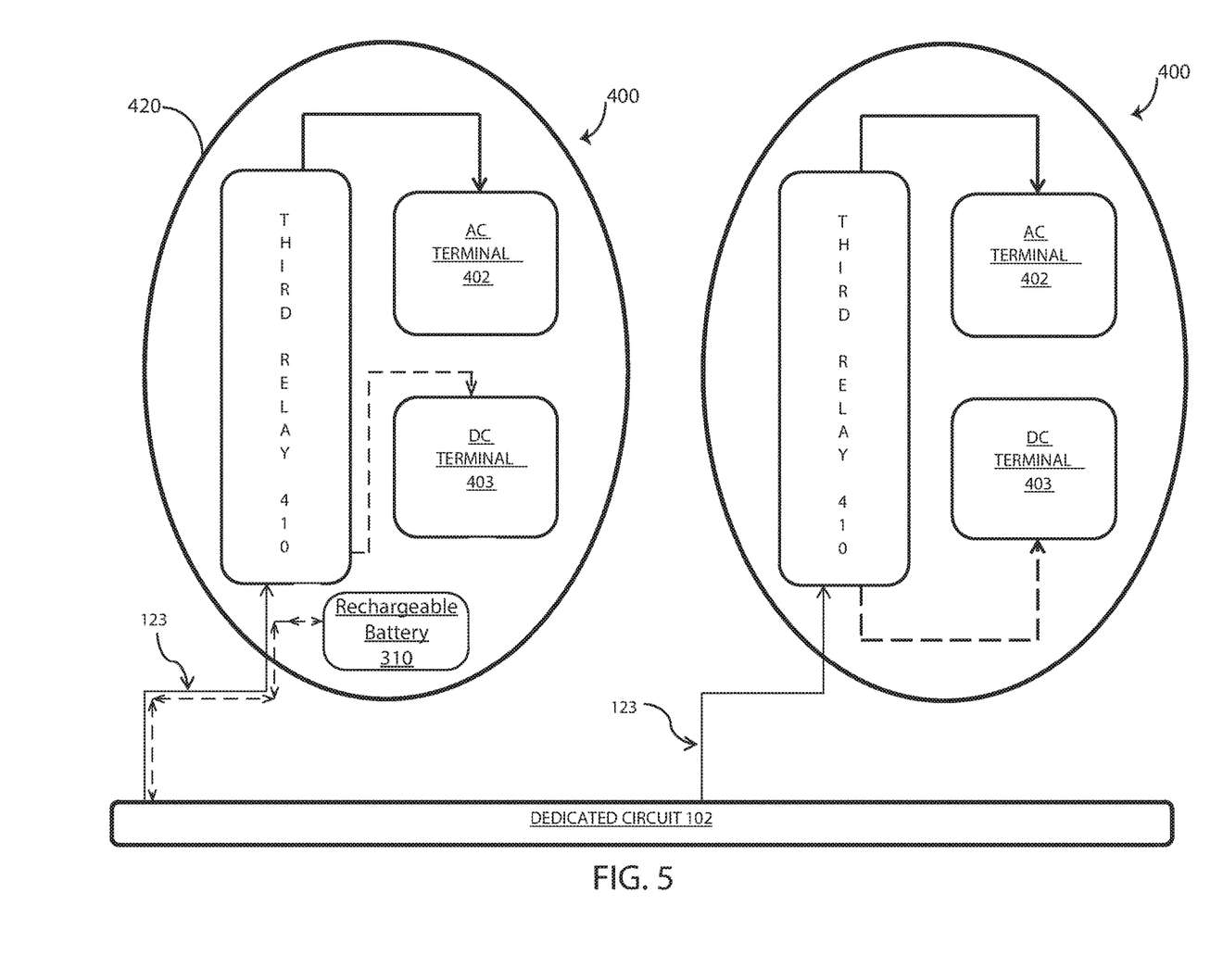
FIG. 5 is a schematic representation of two smoke detectors electrically coupled to a dedicated circuit.

FIG. 5 shows a schematic representation of two smoke detectors 400 electrically coupled to dedicated circuit 102. This illustration is by example only and not meant to be limiting. One, three, or any number of smoke detectors 400 is electrically coupled to dedicated circuit 102 in some of the various embodiments of the invention.

Some examples of a commercially available smoke detector comprise an AC terminal which receives external AC power and an internal DC terminal which coupled to a small, disposable battery, such as a 9-volt DC battery for example, and energizes the smoke detector when AC power is interrupted. In some embodiments of the invention, smoke detector 400 is a commercially available smoke detector comprising a third relay 410 electrically coupled to an AC terminal 402 of the commercially available smoke detector and a DC terminal 403, such as the 9-volt battery terminal of the commercially available smoke detector. In some embodiments, rechargeable battery 310 is housed within a case 420 of smoke detector 400.

Some embodiments of rechargeable battery interconnected smoke detector system 100 comprise one smoke detector 400 having rechargeable battery 310 housed within case 420 and a plurality of additional smoke detectors 400 not having battery 310, wherein direct current from the single rechargeable battery 310 powers a network of interconnected smoke detectors 400 electrically coupled to dedicated circuit 102 under a condition wherein alternating current power is not available. In some embodiments, more than one smoke detector 400 having battery 310 housed within case 420 power a plurality of additional smoke detectors 400 electrically coupled to dedicated circuit 102.

Depending upon the model of the commercially available smoke detector, third relay 410 may be positioned internal to case 420 of smoke detector 400. Alternatively, in some embodiments, third relay 410 may be positioned on the outer surface of the smoke detector case external to the smoke detector, or mounted to the ceiling or other building structure adjacent or near the commercially available smoke detector. In some embodiments, smoke detector 400 is not a smoke detector which is not commercially available, but a smoke detector specifically designed and manufactured for use in embodiments of the battery interconnected smoke detector system.

As shown in FIG. 5, smoke detector 400 comprises third relay 410, an AC terminal 402 and a DC terminal 403. In some embodiments (not shown) smoke detector 400 may comprise a third timed relay. A third timed relay is, however, generally not necessary because any interruption in AC power from AC current source 104 is followed by a short delay created by first timed relay 222 prior to DC power from first direct current source 203 energizing dedicated circuit 122. Regardless, following interruption of AC power, third relay 410 directs DC power to DC terminal 403. Under operating conditions wherein AC power energizes dedicated circuit 122, third relay 410 directs AC power to AC terminal 402. FIG. 5 also shows dedicated circuit current 123, which comprises AC power originating at AC power source 104 (shown in FIG. 1) or DC power originating at first direct current source 203, depending, as discussed extensively herein, upon whether AC power from AC power source 104 is available.

Figure 6:
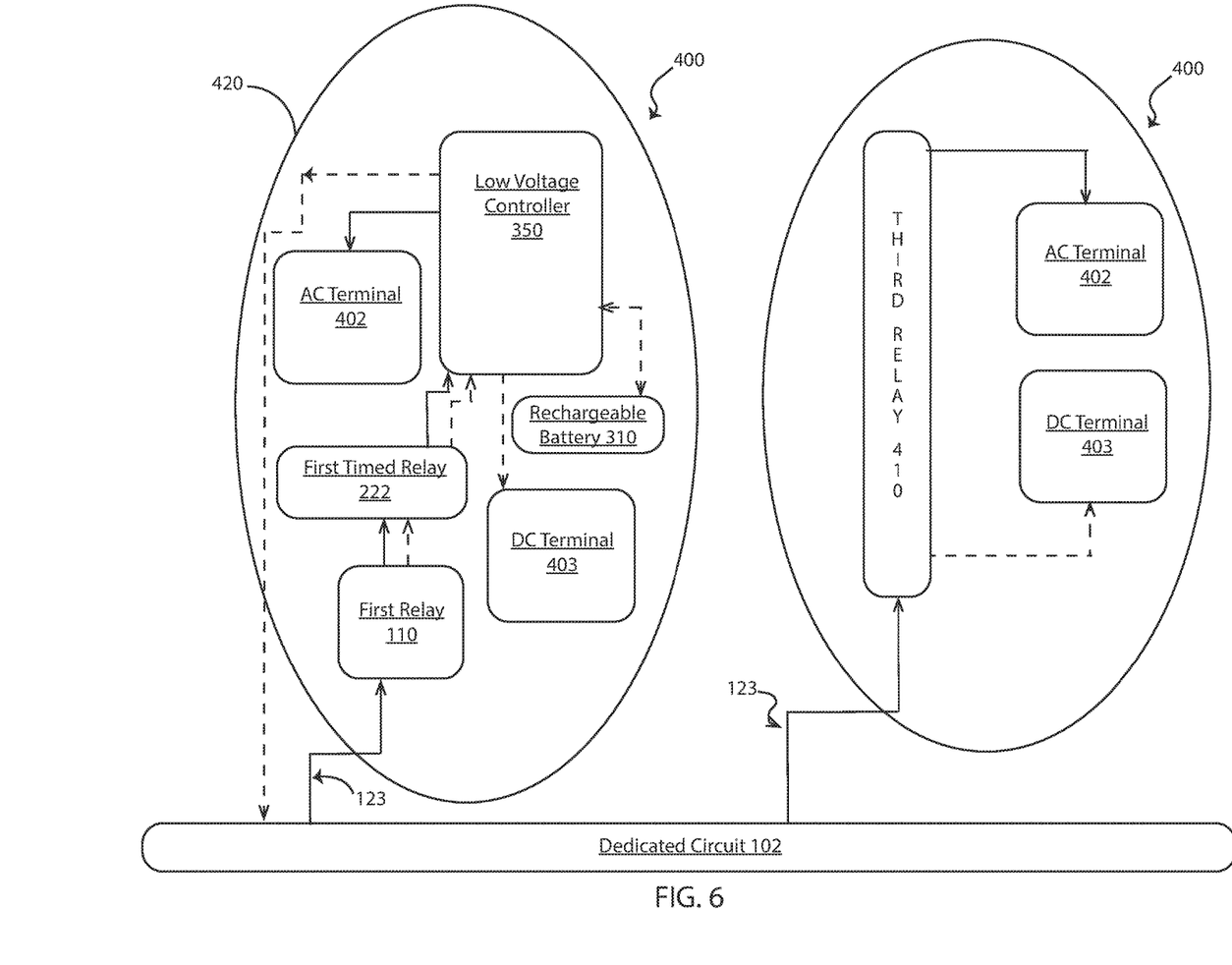
FIG. 6 is an additional schematic representation of a case housing a smoke detector, a rechargeable battery, and a low voltage controller electrically coupled to a dedicated circuit powering a plurality of smoke detectors.

FIG. 6 is an additional schematic representation of a case housing a smoke detector, a rechargeable battery, a first relay, a first timed relay, and a low voltage controller electrically coupled to a dedicated circuit powering a plurality of smoke detectors. FIG. 6 shows two smoke detectors 400 electrically coupled to dedicated circuit 102. One of the two smoke detectors 400 comprises low voltage controller 350 electrically coupled to rechargeable battery 310, first timed relay 222, DC terminal 403, and AC terminal 402. For smoke detector 400 comprising low voltage controller 350 enclosed by case 420, low voltage controller 350 energizes AC terminal 402 when alternating current from AC power source 104 is available and selectively energizes DC terminal 403 with direct current when AC power source 104 is not available. Low voltage controller 350 enclosed with smoke detector 400 by case 420 renders third relay 410 unnecessary. Additionally, low voltage controller 350 is electrically coupled to dedicated circuit 102, wherein low voltage controller 350 selectively delivers direct current from rechargeable battery 310 to all smoke detectors 400 of the interconnected network of smoke detectors 300 of rechargeable interconnected network smoke detector system 100 under a condition wherein dedicated circuit 102 is not energized by AZ power source 104, such as when AC line voltage is interrupted.

In some embodiments, case 420 additionally houses first relay 110, first timed relay 222, or both first relay 110 and first timed relay 222. Housing first relay 110 or first timed relay 222 in case 420 eliminates the need for these components to be placed at a remote location, such as AC/High voltage side 200 (See FIG. 3), which simplifies the design and installation of system 100.

Otherwise, the other smoke detector 400 shown by FIG. 6 does not share an additional case 420 with low voltage controller 350. Third relay, therefore, is utilized in some embodiments of smoke detector 400 and not utilized in some embodiments, such as embodiments of smoke detector 400 comprising low voltage controller 350 and smoke detector 400 enclosed within case 420. It is to be understood that a plurality of smoke detectors 400 may be electrically coupled to dedicated circuit 102. In some embodiments wherein the number of smoke detectors 400 coupled to a single dedicated circuit 102 is limited, additional dedicated circuits 102 may be utilized within system 100 to provide the required number of smoke detectors 300 for the particular installation. Each dedicated circuit 102 is electrically coupled to at least one case 420 housing rechargeable battery 310 and low voltage controller 350, in some embodiments.

Figure 7:
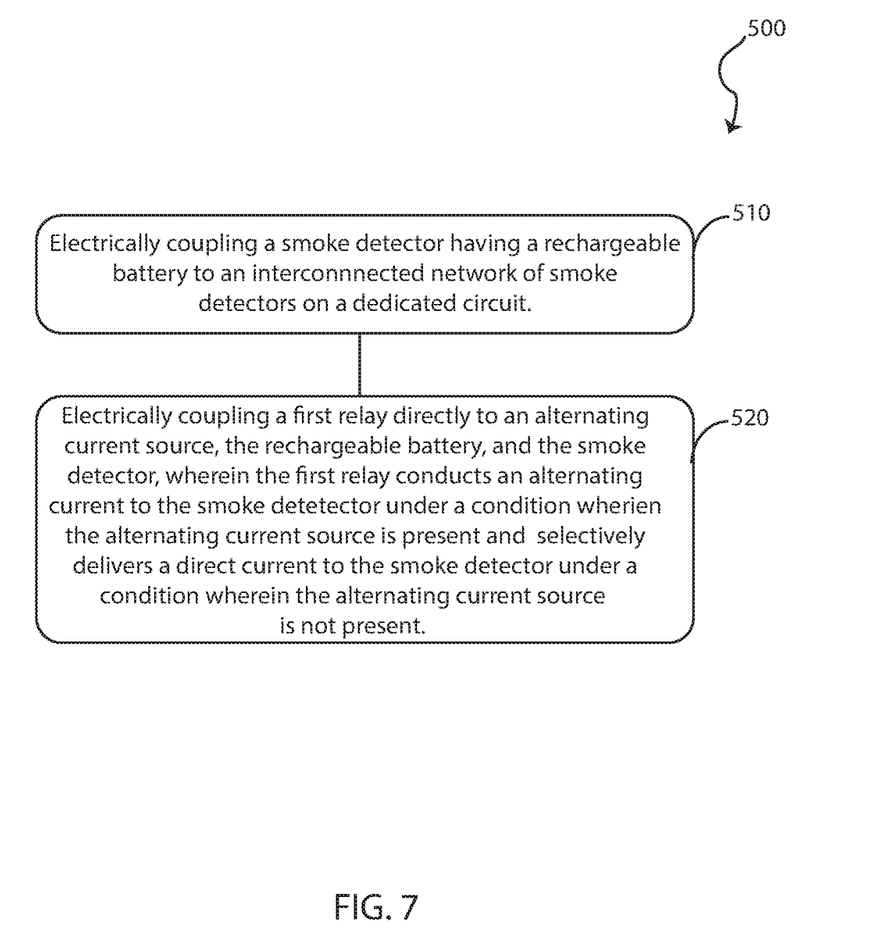
FIG. 7 is a block diagram of a method of forming a rechargeable battery interconnected smoke detector system.

FIG. 7 is a block diagram of a method of forming a rechargeable battery interconnected smoke detector system. FIG. 7 shows a method 500 comprising a first electrical coupling step 510 and a second electrical coupling step 520.

First electrical coupling step 510, in some embodiments, comprises electrically coupling a smoke detector having a rechargeable battery to an interconnected network of smoke detectors on a dedicated circuit. In some embodiments, the rechargeable battery is housed within a case of the smoke detector. In some embodiments, the rechargeable battery is located in a remote building location from the smoke detector. In some embodiments, the rechargeable battery is located inside a control panel on the outside of a building structure.

Second electrical coupling step 520, in some embodiments, comprises electrically coupling a first relay directly to an alternating current source and the smoke detector, wherein the first relay conducts an alternating current to the smoke detector under a condition wherein the alternating current source is present and selectively delivers a direct current to the smoke detector under a condition wherein the alternating current source is not present.

A battery interconnected smoke detector system with single wire AC and DC pass-through relay has been described. The smoke detector system described herein provides a means for continuous, reliable DC backup of an interconnected network of smoke detectors in a building by locating a DC battery in a location convenient to the user, and, in some embodiments, by providing a means to continuously or intermittently recharge a rechargeable battery. It is to be understood that the embodiments of the smoke detector system with single wire AC and DC pass-through relay according to the invention as shown and described is an example only and that many other embodiments of a battery interconnected smoke detector system with single wire AC and DC pass-through relay according to the invention are possible and envisioned.

The embodiments and examples set forth herein were presented to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A rechargeable battery interconnected smoke detector system comprising:
a plurality of smoke detectors to electrically couple to a dedicated circuit;
a rechargeable battery located inside a case of one of the plurality of smoke detectors; and
a first relay to directly electrically couple to the dedicated circuit, an alternating current source, and the rechargeable battery,
wherein the first relay is to selectively conduct an alternating current from the alternating current source to the dedicated circuit to power the plurality of smoke detectors under a condition wherein the alternating current source is present and selectively conduct a direct current from the rechargeable battery to the dedicated circuit to power the plurality of smoke detectors under a condition wherein the alternating current source is not present.

2. The smoke detector system of claim 1, wherein the dedicated circuit comprises a ground plus three-wire circuit.

3. The smoke detector system of claim 1, wherein the dedicated circuit comprises a ground plus two-wire circuit.

4. The smoke detector system of claim 1, further comprising a first timed relay electrically coupled between the alternating current source, a first direct current source, and the first relay.

5. The smoke detector system of claim 1, further comprising a third relay electrically coupled between the dedicated circuit and the smoke detector.

6. The smoke detector system of claim 1, further comprising:
a low voltage controller electrically coupled between the rechargeable battery and the first relay; and
a second direct current source, wherein the low voltage controller conducts a charging current to the rechargeable battery by selecting the second direct current source.

7. The smoke detector system of claim 6, further comprising:
an alternating current to direct current transformer electrically coupled to the alternating current source and the low voltage controller, wherein the second direct current source is the transformer.

8. The smoke detector system of claim 6, wherein the low voltage controller comprises a second relay electrically coupled to the rechargeable battery, a photovoltaic cell, and the first relay, and
wherein the second relay conducts the charging current to the rechargeable battery by selecting from a plurality of second direct current sources.

9. The smoke detector system of claim 8, wherein the plurality of second direct current sources comprise the photovoltaic cell and an alternating to direct current transformer electrically coupled to the alternating current source and the low voltage controller.

10. The smoke detector system of claim 6, wherein the low voltage controller further comprises a second timed relay electrically coupled between a first direct current source and the second relay.

11. The smoke detector system of claim 8, wherein the low voltage controller responds to one activated smoke detector of the plurality of smoke detectors by activating the plurality of smoke detectors.

12. The smoke detector system of claim 1, further comprising a system panel electrically interposed between a service entrance panel and the dedicated circuit.

13. The smoke detector system of claim 1, wherein the smoke detector system is coupled to a fire alarm.

14. A smoke detector comprising:
a case enclosing an alternating current circuit, a direct current circuit, a rechargeable battery coupled to the direct current circuit, an external current source, and a relay;
wherein the relay determines whether the external current source is an alternating current or a direct current and routes the external current source to the alternating current circuit or the direct current circuit of the smoke detector accordingly, wherein the smoke detector is to power at least one other smoke detector via the rechargeable battery responsive to a determination that alternating current is unavailable.

15. The smoke detector of claim 14, wherein the external current source is a direct current source from either a photovoltaic cell or an alternating-to-direct-current transformer.

16. An interconnected smoke detector system comprising:
a smoke detector enclosed in a case and electrically coupled to a dedicated circuit;
a first direct current source comprising a rechargeable battery enclosed in the case;
a second direct current source comprising a photovoltaic cell or an alternating-to-direct-current transformer;
a first relay to electrically couple to an alternating current source and the first direct current source, wherein the first relay is to selectively conduct an alternating current to the dedicated circuit to power at least one other smoke detector under a condition wherein the alternating current source is present and to selectively conduct a direct current from the rechargeable battery to the dedicated circuit to power the at least one other smoke detector under a condition wherein the alternating current source is not present; and
a low voltage controller electrically coupled between the first direct current source and the first relay, the low voltage controller comprising a second relay electrically coupled to the rechargeable battery, the second direct current source, and the first relay, wherein the second relay is to conduct a charging current to the rechargeable battery from the second direct current source.

17. The interconnected smoke detector system of claim 16, wherein the low voltage controller is enclosed in the case.

18. The interconnected smoke detector system of claim 17, further comprising:
a plurality of smoke detectors electrically coupled to the dedicated circuit, wherein the first relay selectively conducts an alternating current to the dedicated circuit under a condition wherein the alternating current source is present and selectively conducts a direct current from the rechargeable battery to the dedicated circuit under a condition wherein the alternating current source is not present.

19. A method of forming a rechargeable battery interconnected smoke detector system comprising:
electrically coupling a smoke detector having a rechargeable battery to an interconnected network of smoke detectors on a dedicated circuit; and
electrically coupling a first relay directly to an alternating current source, the rechargeable battery, and the smoke detector, wherein the first relay conducts an alternating current to the smoke detector and at least one other smoke detector under a condition wherein the alternating current source is present and selectively delivers a direct current to the smoke detector and the at least one other smoke detector under a condition wherein the alternating current source is not present.

20. The method of claim 19, further comprising:
electrically coupling a low voltage controller between the rechargeable battery and the first relay; and
electrically coupling the rechargeable battery to the low voltage controller, wherein the low voltage controller conducts a charging current to the rechargeable battery by selecting a second direct current source.

21. The method of claim 20, further comprising:
electrically coupling an alternating to direct current transformer between the alternating current source and the low voltage controller; and
electrically coupling a photovoltaic cell to the low voltage controller, wherein the low voltage controller selects the charging current from between the transformer and the photovoltaic cell.

\* \* \* \* \*